(12) United States Patent
Lord et al.

(10) Patent No.: US 6,842,190 B1
(45) Date of Patent: Jan. 11, 2005

(54) VIDEO BIT STREAM EXTENSION WITH SUPPLEMENTARY CONTENT INFORMATION TO AID IN SUBSEQUENT VIDEO PROCESSING

(75) Inventors: Christopher J. Lord, Portland, OR (US); Fernando C. M. Martins, Hillsboro, OR (US); Brian R. Nickerson, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/347,947

(22) Filed: Jul. 6, 1999

(51) Int. Cl.[7] .................................................. H04N 5/76
(52) U.S. Cl. ................................ 348/231.5; 348/207.99
(58) Field of Search ......................... 348/231.5, 207.99, 348/231.3

(56) References Cited

U.S. PATENT DOCUMENTS

| | | | | | |
|---|---|---|---|---|---|
| 6,332,144 | B1 | * | 12/2001 | deVries et al. ............... | 707/102 |
| 6,357,042 | B2 | * | 3/2002 | Srinivasan et al. ............ | 725/32 |
| 6,530,021 | B1 | * | 3/2003 | Epstein et al. ............... | 713/176 |
| 6,590,608 | B2 | * | 7/2003 | Matsumoto et al. ...... | 348/231.2 |
| 6,597,406 | B2 | * | 7/2003 | White et al. ................. | 348/587 |
| 2002/0060686 | A1 | * | 5/2002 | Matsumoto et al. ......... | 345/582 |
| 2003/0011684 | A1 | * | 1/2003 | Narayanaswami et al. ........ | 348/207.99 |
| 2003/0122941 | A1 | * | 7/2003 | Okayama et al. ......... | 348/231.2 |

OTHER PUBLICATIONS

R. Tsai, "An Efficient and Accurate Camera Calibration Technique for 3D Machine Vision", Proceedings of the IEEE, Computer Vision and Pattern Recognition, pp. 364–374, Jun. 1986.

D. Simon, M. Herbert and T. Kanade, "Real–time 3–D Pose Estimation Using a High–Speed Range Sensor", Technical Report CMU–RI–TR–93–94, Robotics Institutem Carnegie Mellon University, Nov., 1993.

F.C.M. Martins, H. Shiojiri and J.M.F. Moura, "3D–3D Registration of Free Formed Objects Using Shape and Texture", Conference on Visual Communications and Image Processing (VCIP '97), San Jose, CA.

L. Agapito, R. Hartley and E. Hayman, "Linear Self Calibration of a Rotating and Zooming Camera", IEEE Conference on Computer Vision and Pattern Recognition 1999 (CVPR '99), Ft. Collins, CO, pp 15–21.

* cited by examiner

Primary Examiner—Tuan Ho
Assistant Examiner—Heather R. Long
(74) Attorney, Agent, or Firm—Blakely, Sokoloff, Taylor & Zafman LLP

(57) ABSTRACT

A method and apparatus are provided for annotating video and audio media with supplementary content for post video processing. The method includes the steps of accepting video data from a video source and storing video information associated with the video data as the video data is being accepted. Then, the video information may be appended to the video data for later use in the form of annotations, for example.

19 Claims, 6 Drawing Sheets

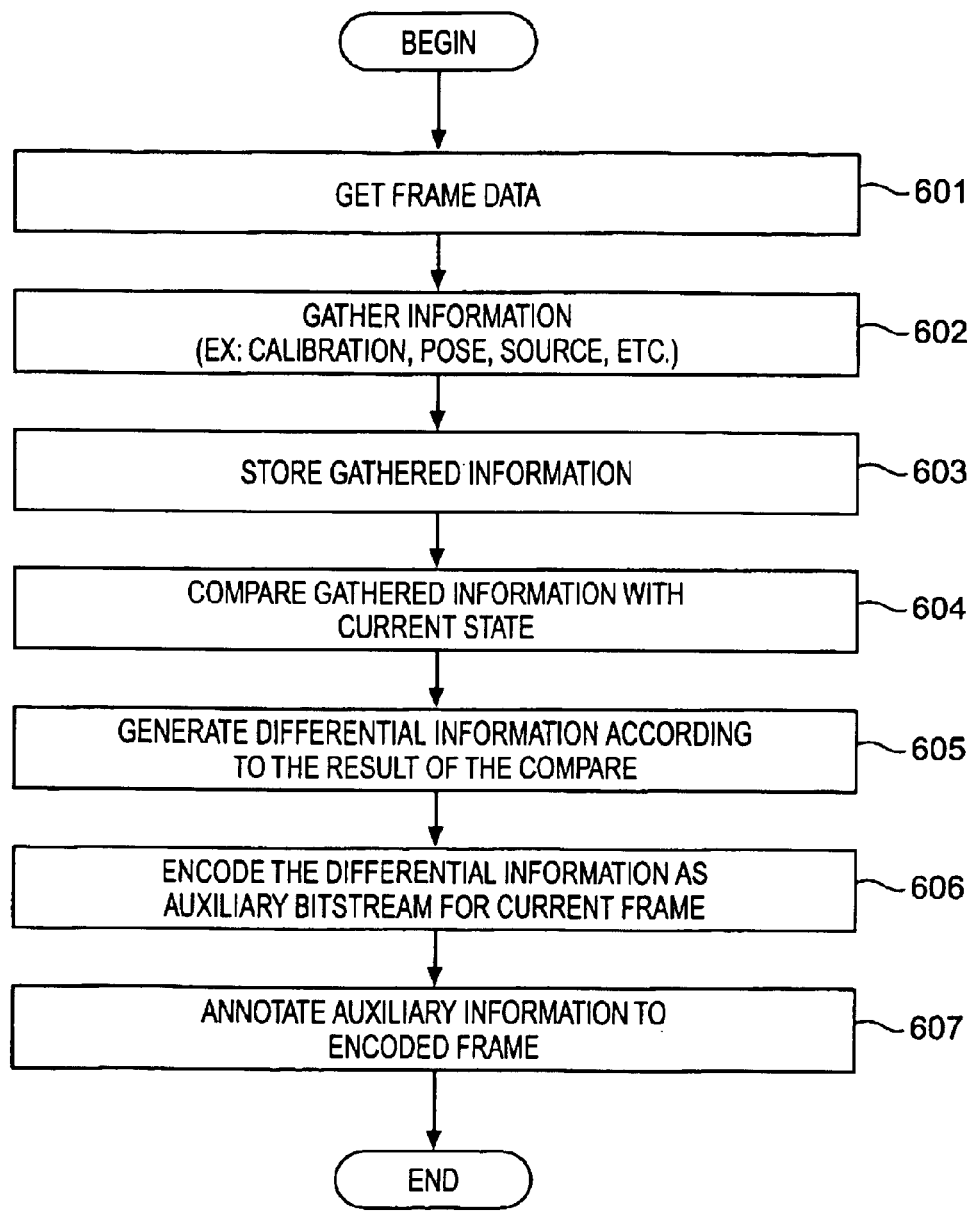

VIDEO BIT STREAM EXTENSION WITH SUPPLEMENTARY CONTENT INFORMATION TO AID IN SUBSEQUENT VIDEO PROCESSING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION (1) Field of the Invention

The present invention is related to the field of video processing, and more specifically, to the method and apparatus of video bit stream extension to aid in subsequent video processing.

(2) Related Art

Currently, the motion picture and television industries utilize various video processing methods and apparatus to create special effects to captured video. Typically, video images are captured by some type of a video capture device, and recorded on a storage device. One or more video sequences from one or more video sources, such as a storage device, may be analyzed to collect information regarding each video sequence. The collected information is then utilized to manipulate the video sequence through, for example, some type of computer system, to create special effects. For example, video sequences from two different sources may be merged by video compositing to create special effects. In order to perform video compositing, information regarding each video sequence may be useful.

It is therefore desirable to provide a method and apparatus to generate an extended video bit stream for a video sequence. The desired extended video bit stream would contain non-visual information useful in several applications including but not limited to motion picture and television special effects, post processing, video editing and video library management.

BRIEF SUMMARY OF THE INVENTION

A method for annotating video and audio media with supplementary content for post video processing is disclosed. The method includes the steps of accepting video data from a video source and storing video information associated with the video data as the video data is being accepted. Then, the video information may be appended to the video data for later use in the form of annotations, for example.

BRIEF DESCRIPTION OF THE DRAWINGS

FIG. 6 is a flow diagram illustrating the general steps followed by annotator software configured to annotate a video bit stream with certain video processing information according to one embodiment of the present invention.

DETAILED DESCRIPTION OF THE INVENTION

The present invention relates to a method and apparatus for producing an annotated video extended bit stream to aid video processing. In one embodiment of the present invention, certain video sequence information is collected on a per frame, per video segment or a per scene basis, as video data is being provided through a video source device. Video information is added to a video bit stream to generate an extended video bit stream with annotations (hereinafter referred to as an annotated video extended bit stream).

The annotated video extended bit stream of the present invention includes both the original video sequence as well as certain additional non-visual information. The additional non-visual information is useful in subsequent processing of the video data provided by a video source device for several applications including special effect processing, easy access to video databases, efficient video coding, and easier generation of three-dimensional models.

Prior art methods must rediscover the information which the present invention annotates by using only the available visual data. Further, the present invention solves mathematically ill posed problems for which solutions are not available. Additionally, the present invention efficiently provides access to data for which solutions are possible, but are obtained through great computational cost. The present invention leads to better and faster compression via model building than prior art methods which rediscover the factors from the captured media only.

Additionally, the present invention allows better digital manipulation of media. For example, three-dimensional models of objects in a scene can be constructed and used as search keys in a video database, and geometric and photometric properties can be used as derived search keys. Camera scene content is already often under program control. This control information as well as what can be sensed in the camera, such as a cameraman turning a zoom lens and camera pose, is conveyed to subsequent processing software through the annotated video extended bit stream of the present invention.

Although the present invention is described for use in the motion picture and television industries, the present invention may also be useful in video cameras used by consumers to automatically or manually annotate certain parameters set during recording, such as zoom factor or focus.

Figure 1A:
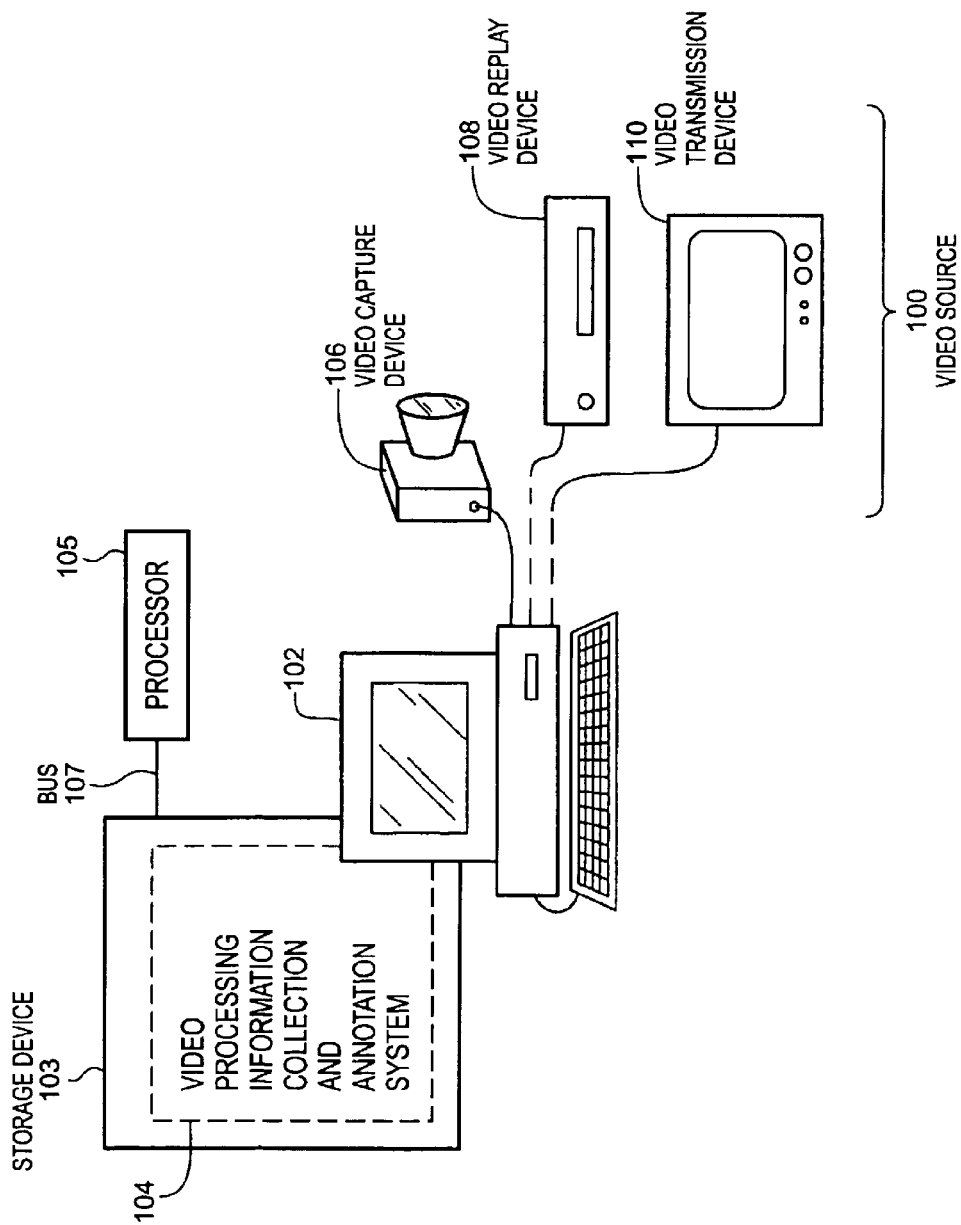
FIG. 1a is an exemplary system block diagram of a video source and video output video processing system according to one embodiment of the present invention.

FIG. 1a is an exemplary system block diagram illustrating a video source and video output system according to one embodiment of the present invention. In this example, the video processing information collection and annotation system 104 may be implemented for use on a computer 102 with some type of a storage device 103 coupled to a processor 105 by bus 107. The computer 102 may be coupled to a video source 100 configured to provide video data (video sequence) to the computer 102. In one embodiment, the video source 100 may be, but is not limited to, a video capture device 106 such as a camera, a video replay device 108 such as a video camera recorder (VCR) and a video transmission device 110 such as a digital or an analog television (TV).

The present invention's video processing information collection and annotation system 104 collects certain video processing information from video image data (frame or scene) as they are provided from the video source 100 and generates an annotated video extended bit stream comprised of the video image data as well as corresponding video processing information.

Although the video processing information collection and annotation system 104 is illustrated as being implemented in a computer 102, a person skilled in the art provided with the detailed description herein may appreciate that the video processing information collection and annotation system 104 may also be implemented in the video source 100 such as a camera.

Figure 1B:
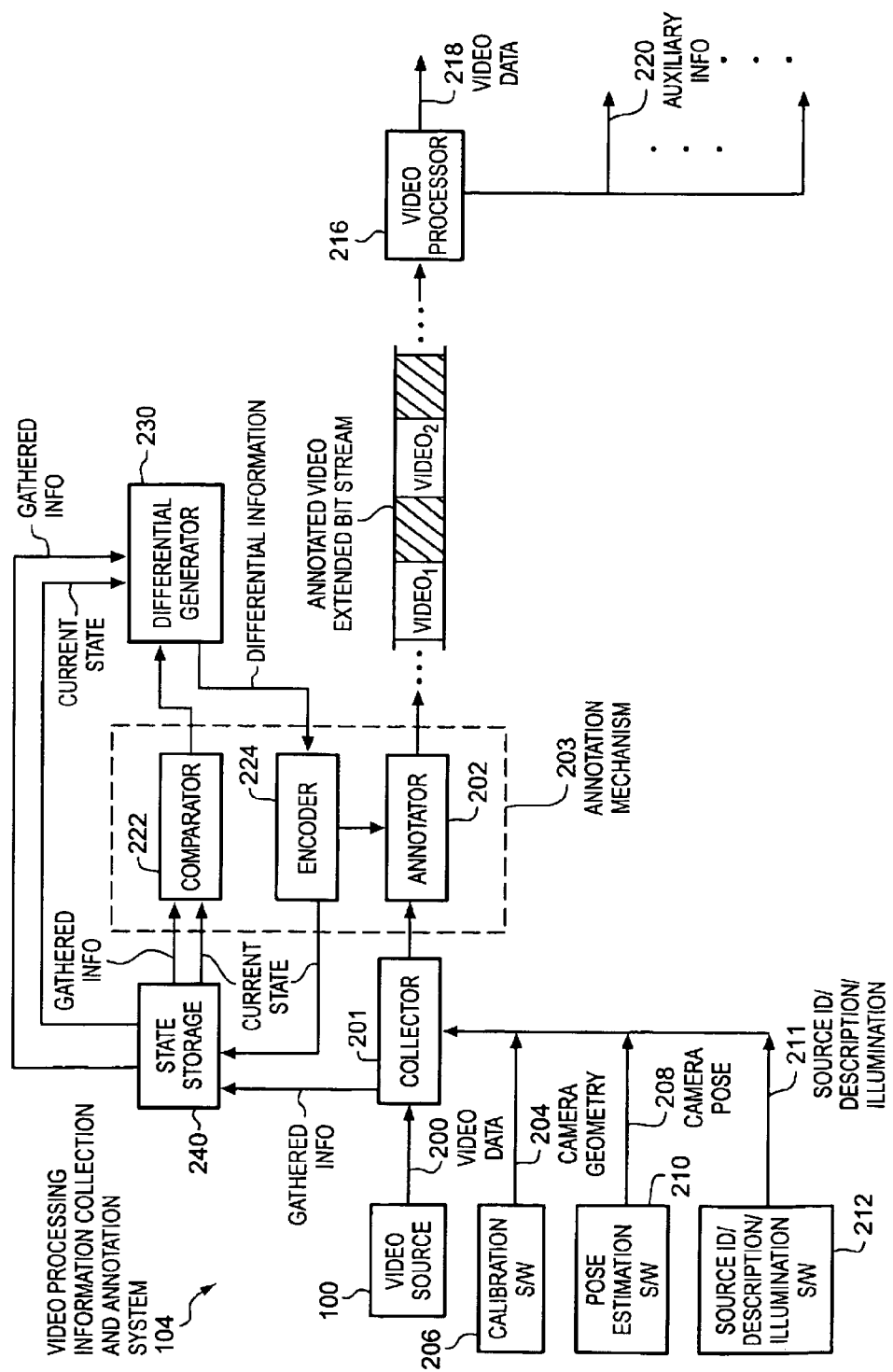
FIG. 1b illustrates a video processing information collection and annotation system according to one embodiment of the present invention.

FIG. 1b illustrates a video processing information collection and annotation system 104 according to one embodiment of the present invention. Video data 200 is provided by video source 100 in the form of frames (scenes) and forwarded to a collector 201. A calibration software 206, such as NCAMERA from REALVIZ of Sophia Antipolis Cedex, France, generates camera geometry information 204. The camera geometry information 204 may be generated either from the video data 200 provided by the video source 100 or as the video data is being captured by a video capture device 106. The camera geometry information 204 is then forwarded the information on to the collector 201. Similarly, a pose estimation software 210, such as MATCHMOVER from REALVIZ of Sophia Antipolis Cedex, France, generates camera pose information 208. The camera pose information 208 may be generated from the video data 200 provided by the video source 100 or at the same time that the video data 200 is being captured by a video capture device 106. The camera pose information 208 is then forwarded to the collector 201.

Source identification/description and illumination information is gathered by a source identification/description/illumination input software 212 from, for example, input by a camera operator (user) or a television director operating a television switcher (not shown). The information gathering may be fully automated by the television switcher. The gathered source identification/description/illumination information 211 is then forwarded along with the camera geometry information 204 and the camera pose information 208 to the collector 201. The collector 201 forwards the information collected to an annotator 202.

The annotator 202 is a part of an annotation mechanism 203 which also includes a comparator 222, and an encoder 224, described below. The comparator of the annotation mechanism is coupled to state storage 240 to receive the gathered information from the collector and current state information. It sends comparator information to a differential generator 230. The encoder of the annotation mechanism is coupled to the differential generator 230 to receive differential information and to the state storage 240 to send current state information.

The current state of the frame data and the gathered information are received and pared by a comparator 222. The gathered information and current state are also received by a differential generator 230 which determines the differential information.

More specifically, the auxiliary information is gathered periodically but only encoded in the bit stream if there are changes. The current state indicates the latest encoded information in the bit stream and is kept in memory, e.g., state storage 240. The differential information is the difference between the current information and the gathered information. If the information remains the same, there is no need to annotate the bit stream.

The differential information is encoded by an encoder 224 as auxiliary information for the current frame data. The annotator 202 stores the various information gathered in the video bit stream 200 by extending the original bit stream format. The annotated video extended bit stream 214 may be utilized by a video processor 216 to separate video data 218 from auxiliary information 220. The video data 218 is equivalent to video data 200 before processing by the annotator 202 and the auxiliary information 220 is additional information gathered regarding the video data 200 including the camera geometry information 204, the camera pose information 208 and the source identification/description/illumination information 211.

Figure 2:
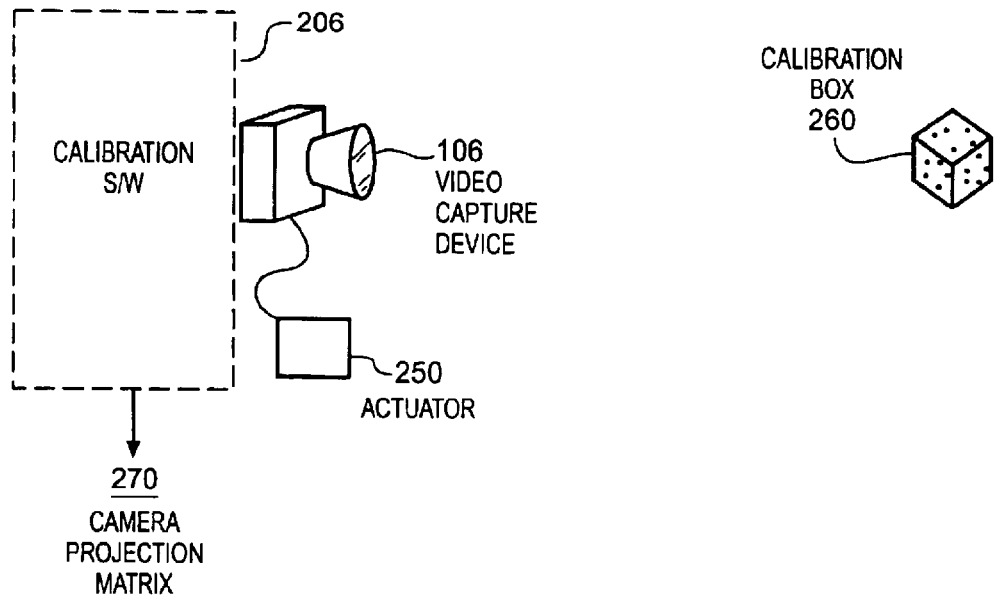
FIG. 2 is a block diagram illustrating calibration software configured to determine camera geometry information from each frame and/or scene data of a video sequence made available through a video source device according to one embodiment of the present invention.

FIG. 2 is a block diagram illustrating the gathering of calibration information according to one embodiment of the present invention. In this example, camera geometry (intrinsic parameters) is provided by a camera calibration procedure which provides a camera projection matrix 270. In one embodiment, instrumentation attached to a set of actuators 250 is used to control and keep track of the geometry of cameras (e.g., auto-focus). Calibration is obtained by using a calibration box 260 of known size and shape with a distinct set of markers on its surface. The calibration software 206 utilizes the calibration box 260 to produce the camera projection matrix 270.

More specifically, in one embodiment, a video capture device 106 such as a camera causes a transformation to the incumbent light. This transformation depends on the physical arrangement of lenses and light sensors of the video capture device that is modeled by a 3×4 transformation matrix also referred herein as a camera projection matrix 270. The twelve parameters from the projection matrix define the camera geometry. Various methods for producing the projection matrix 270 are well known.

Figure 3:
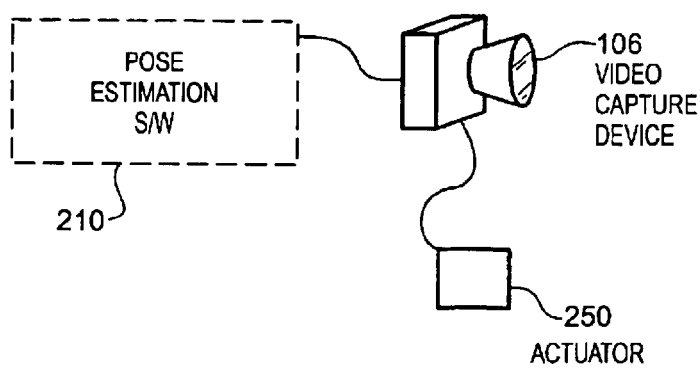
FIG. 3 is a block diagram of pose estimation software configured to determine camera pose information for each frame and/or scene data collected from a video source device according to one embodiment of the present invention.

FIG. 3 is a block diagram illustrating the gathering of camera pose estimation information according to one embodiment of the present invention. The camera pose information 208 includes extrinsic camera parameters. More specifically, the images generated by a video capture device such as a camera depends on the position of the video capture device 106. The six degrees of freedom of camera pose may be defined with respect to a given reference. For example, the position of the camera on the very first frame may be used as a reference from which the camera pose for the subsequent frames may be measured.

Computation of the pose estimation information 208 may be made by the pose estimation software 210. Depth maps are estimated from a video sequence by using structure from motion. For example, the registration of the depth map to a three-dimensional model of the scene provides the pose information. The three-dimensional scene model may be constructed using the registered data in one embodiment. Obtaining pose estimation from video data is well known in the art and needs no further discussion.

Alternatively, camera pose may be provided by a position tracking system based on gyroscopes, pendulums or magnetic field sensors (similar to those used in virtual reality helmets) installed in a video capture device 106 and provided to the collector 201 by the video capture device 106. Instrumentation attached to a set of actuators 250 (attached to the video capture device 106) may be used to remotely control the pose of robotic cameras remotely.

Figure 4:
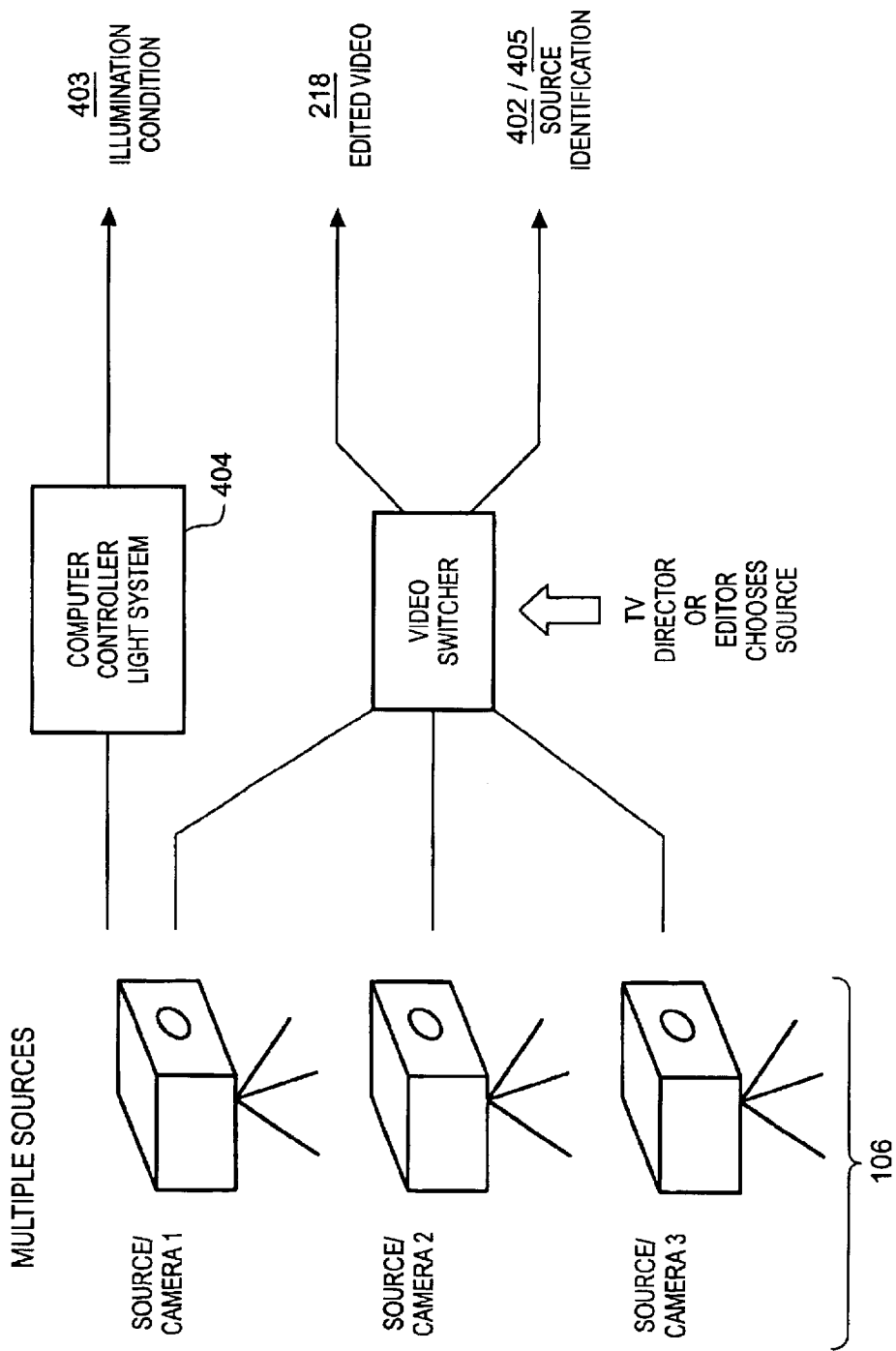
FIG. 4 is a block diagram of illumination input software which is configured to accept illumination information for a given frame or scene data of a video sequence provided through a video source device according to one embodiment of the present invention.

FIG. 4 is a block diagram illustrating the gathering of source identification/description and illumination information according to one embodiment of the present invention. Video source identification and description is provided by using information which is available either at a television (TV) switcher (live production) or editing A/B roll machine (off-line production). A TV director/editor defines an editing list which is implemented by an operator controlling the TV switcher 400 or A/B roll machine.

All cameras and video sources are logged before actual editing. For future movies, this process is performed at the story board. Story board drawings and text have a one-to-one correspondence to video shoots. Individual shoot description may be annotated with the final video at production time.

Video source identification 402, which is part of the source identification/description/illumination information 211 delineates one parameter which defines a source number. More specifically, production video typically is composed from multiple video sources 106 where each clip may be identified at production time. Each clip has an associated parameter which defines a source number for the clip.

The video source description 405 of the source identification/description/illumination information 211 refers to textual descriptions for distinct video sources. For instance, TV directors typically have textual descriptions for distinct video sources, such as for a National Basketball Association (NBA) game. "Scoreboard shoot", "court overview", "action on court", "close-up on coach", or "close-up of commentator" are different source descriptions.

Finally, the illumination condition 403, also part of the source identification/description/illumination information 211, refers to computer controlled sets and lighting system 404. The controls may be annotated as part of the scene description as well. For insertion of computer-generated actors in a scene, lighting information is fundamental on a per-frame basis.

Figure 5A:
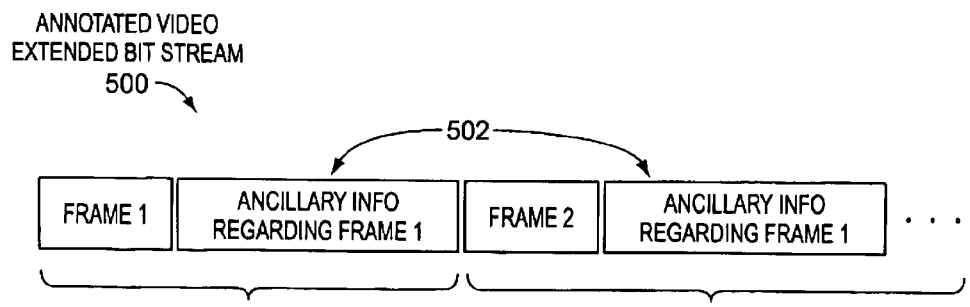
FIGS. 5a–5c illustrate an annotated video extended bit stream format according to one embodiment of the present invention.
Figure 5B:
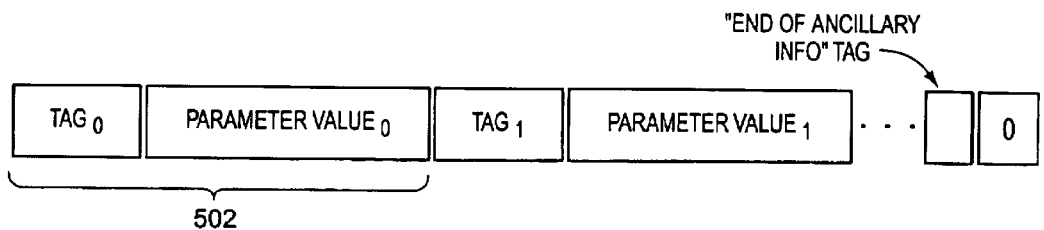
Figure 5C:
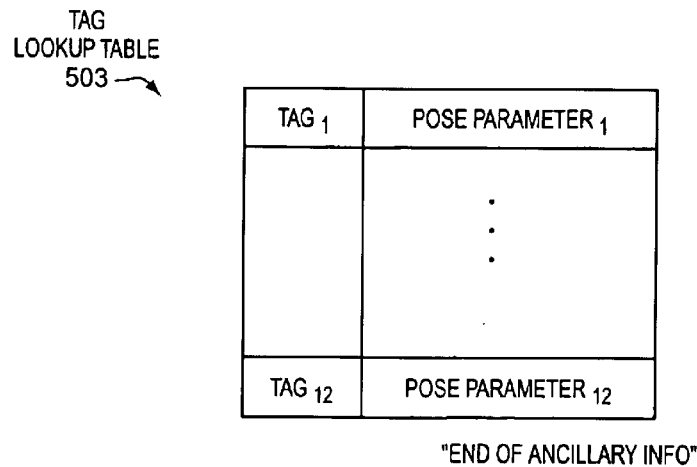

FIGS. 5a–5c illustrate an exemplary annotated video extended bit stream format according to one embodiment of the present invention. The exemplary annotated video extended bit stream 500 illustrated in FIG. 5a has ancillary information 502 which is a list of parameters of arbitrary length. The parameters are described in more detail in a corresponding entry in a tag lookup table 503 illustrated in FIG. 5c. In one embodiment, the tag lookup table 503 resides in storage device 103. The parameters having the information described in FIGS. 2, 3 and 4 are valid until a new setting appears in the annotated video extended bit stream 500.

FIG. 6 is a flow diagram illustrating the general steps followed by annotator software configured to annotate a video bit stream with certain video processing information according to one embodiment of the present invention. In step 601, frame data is obtained from a video source. In step 602, information regarding the frame data, including camera geometry 204, camera pose 208 and source identification description illumination software 211 is gathered. In step 603, gathered information is stored in a state storage device.

In step 604, the current state of the frame data and the gathered information is compared by a comparator 222.

In step 605, differential information is generated according to the results of the comparison. More specifically, the auxiliary information is gathered periodically but only encoded in the bit stream if there are changes. The current state indicates the latest encoded information in the bit stream and is kept in memory. The differential information is the difference between the current information and the gathered information. If the information remains the same, there is no need to annotate the bit stream.

In step 606, the differential information is encoded by an encoder 224 as auxiliary information for the current frame data. In step 607, the auxiliary information is annotated to the encoded frame data to generate an annotated video extended bit stream 214.

What has been described is a method and apparatus for annotating video and audio media with supplementary content for subsequent video processing. Prior art methods must rediscover the information which the present invention annotates by using only the available visual data. The present invention solves mathematically ill posed problems for which solutions are not available. Additionally, the present invention efficiently provides access to data for which solutions are possible, but are obtained through great computational cost. The present invention leads to better and faster compression via model building than prior art methods which rediscover the factors from the captured media only.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A method of annotating video data comprising:
   accepting video frame data from a video source, the video frame data corresponding to a sequence of video frames;
   gathering video information distinct from and describing the video frame data and storing the video information;
   comparing video information describing a current video frame with the stored video information;
   generating differential information based on the comparing; and
   inserting the differential information as annotation frames between frames of the sequence of video frames, the annotation frames being separate and distinct from the video frames.

2. The method of claim 1, wherein the video information comprises camera geometry information.

3. The method of claim 1, wherein the video information comprises camera pose information.

4. The method of claim 1, wherein the video information comprises source identification/description/illumination information.

5. The method of claim 1, wherein the video frame data comprises images obtained from a camera.

6. The method of claim 1, wherein comparing comprises comparing video information describing a current video frame with camera geometry information, camera pose information and source identification/description/ illumination information of the video frame data.

7. The method of claim 1, wherein storing comprises appending the differential information to the video frame data.

8. An apparatus comprising:

a video source to generate video frame data;

a collector configured to collect video information distinct from and describing the video frame data to be associated with the video frame data and to store the video information;

a comparator to compare video information describing a current video frame with the stored video information;

a differential generator to determine differential information based on the comparison; and an annotator coupled to the differential generator to annotate the video frame data with the differential information, the differential information being inserted as annotation frames between frames of the video frame data, the annotation frames being separate and distinct from the frames of the video frame data.

9. The apparatus of claim 8, wherein the video information comprises one or more of: camera geometry; camera pose information; and source identification/description/illumination information.

10. The apparatus of claim 9, further comprising calibration software configured to generate the camera geometry information for the video frame data as the video frame data is being gathered by the video source and to provide the generated camera geometry information to the collector.

11. The apparatus of claim 9, further comprising pose estimation software configured to generate the camera pose information for the video frame data as the video frame data is being gathered by the video source and provide the generated camera pose information to the collector.

12. The apparatus of claim 9, further comprising an encoder coupled to the differential generator configured to encode the differential information as an input to the annotator.

13. The apparatus of claim 12, wherein the encoder forwards a current state of the video information to a state storage device coupled to the encoder.

14. A machine-readable medium having stored thereon data representing instructions which, when executed by a machine, cause the machine to perform operations comprising:

accepting video frame data from a video source, the video frame data corresponding to a sequence of video frames;

gathering video information distinct from and describing the video frame data and storing the video information;

comparing video information describing a current video frame with the stored video information;

generating differential information based on the comparing; and inserting the differential information as annotation frames between frames of the sequence of video frames, the annotation frames being separate and distinct from the video frames.

15. The medium of claim 14, wherein the video information is cam era geometry information.

16. The medium of claim 14, wherein the video information is camera pose information.

17. The medium of claim 14, wherein the video information is source identification/description/illumination information.

18. The medium of claim 14, wherein the video source is a video capture device.

19. The medium of claim 14 wherein the instructions for storing comprise instructions which, when executed by the machine, cause the machine to perform further operations comprising appending the differential information to the video frame data.

* * * * *

UNITED STATES PATENT AND TRADEMARK OFFICE
CERTIFICATE OF CORRECTION

PATENT NO. : 6,842,190 B1
DATED : January 11, 2005
INVENTOR(S) : Lord

It is certified that error appears in the above-identified patent and that said Letters Patent is hereby corrected as shown below:

Column 4,
Line 2, delete "pared" and insert -- compared --.

Column 5,
Line 5, delete "201" and insert -- 2d --.

Column 8,
Line 24, delete "cam era" and insert -- camera --.

Signed and Sealed this

Twenty-fourth Day of May, 2005

JON W. DUDAS
*Director of the United States Patent and Trademark Office*